(12) United States Patent
Perrin et al.

(10) Patent No.: US 7,277,844 B2
(45) Date of Patent: Oct. 2, 2007

(54) CROSS PLATFORM FILE SYSTEM EMULATION

(75) Inventors: Benoit Perrin, Vannes (FR); Christophe Cleraux, Sene (FR); Morvan Le Goff, Vannes (FR)

(73) Assignee: Wind River Systems, Inc, Alameda, CA (US)

( * ) Notice: Subject to any disclaimer, the term of this patent is extended or adjusted under 35 U.S.C. 154(b) by 731 days.

(21) Appl. No.: 10/401,034

(22) Filed: Mar. 27, 2003

(65) Prior Publication Data

US 2004/0088152 A1    May 6, 2004

Related U.S. Application Data

(63) Continuation-in-part of application No. 10/287,225, filed on Nov. 4, 2002, now Pat. No. 7,158,928.

(51) Int. Cl.
  *G06F 9/455*    (2006.01)

(52) U.S. Cl. .......................... 703/23; 703/24

(58) Field of Classification Search .......... 703/23, 703/24; 707/5, 205; 709/213; 715/527; 717/138
See application file for complete search history.

(56) References Cited

OTHER PUBLICATIONS

Copending U.S. Appl. No. 10/287,225 by Benoit Perrin et al filed on Nov. 4, 2002.*

* cited by examiner

*Primary Examiner*—Leo Picard
*Assistant Examiner*—Carlos R. Ortiz-Rodriguez
(74) *Attorney, Agent, or Firm*—Davidson, Davidson & Kappel, LLC (57) ABSTRACT

A method for emulating one or more file system functions is provided. On a first processing device, a request is received. The request comprises a first data indicating a first file that a file system resident on the first processing device does not support. In an emulation library a second data for emulation of the first file is located. A response based upon the first and second data is formed.

14 Claims, 9 Drawing Sheets

UNIXStat
VER=1.0

Default global definition

\set permfile=0775 (410)
\set permdir=0750 (420)
\set permdev=0664 (430)
\set uid=132 (450)
\set gid=100 (460)
\set perm= 000 (440)
\set atime=12 (470)
\set ctime =5 (480)
\set mtime=12.5 (490)

Files specifications

/tmp    permdir=1755 gid=0 uid=0
/usr/tmp  hlink=/tmp (415)
/etc    perm=755 \
      gid=0 uid=0
/dev   perm=755 \   (435)
      gid=0 \
      uid=0
/dev/null dev=c,3,1 permdev=0666 gid=0 uid=0 # new device node
/usr/namedPipe dev=p  # Creation of a named pipe
/bin "/usr/sbin/My Application" perm=0740 gid=0 uid=0
/sbin/app slink="/usr/sbin/My Application" \ (425)
      uid=0 \
tag     gid=0 (455)
/usr/src/aux map=_aux tag=src-package.tar.gz special variable map /usr/src=/dev/src (445)

CROSS PLATFORM FILE SYSTEM EMULATION

RELATED APPLICATION

This application is a continuation-in-part of U.S. patent application Ser. No. 10/287,225 filed Nov. 4, 2002 now U.S. Pat. No. 7,158,928, the entire disclosure of which is hereby incorporated by reference.

A portion of the disclosure of this patent document contains material which is subject to (copyright or mask work) protection. The (copyright or mask work) owner has no objection to the facsimile reproduction by any one of the patent disclosure, as it appears in the Patent and Trademark Office patent files or records, but otherwise reserves all (copyright or mask work) rights whatsoever.

BACKGROUND INFORMATION

A computer program can be viewed as a detailed plan or procedure for solving a problem with a computer: an ordered sequence of computational instructions necessary to achieve such a solution. The distinction between computer programs and equipment is often made by referring to the former as software and the latter as hardware. An operating system (OS) is a set of programs that controls the interaction between applications and hardware. The OS also controls the interaction between different applications. The OS also provides generalized system services to application programs, such as utility and daemon programs. These system services conventionally include access to hardware peripheral devices attached directly or indirectly to the computer system. For example, the OS provides access to system hardware (e.g., by device drivers), and access to the file system on the hardware (e.g., by file system utilities.)

UNIX™, Windows™, and MacOS™ are examples of OSes. There are different varieties of UNIX™, such as FreeBSD™ and LINUX™, and different versions of Windows™, such as Microsoft's Windows NT™ and Windows 2000™. WindRiver's BSD/OS™ is a UNIX based OS derived from 4.4BSD Lite-1™. There are also different versions of MacOS™, such as MacOS 9.0™ and MacOS X™. Different OSes use different file systems for file access. For example, Windows NT™ uses Win32 file systems, such as FAT, or NTFS, while UNIX type systems use different types of file systems, such as UFS/FFS (UNIX File System and Fast File System) or ext2fs. UFS is a superset of FFS. UFS file system supports features that are not supported in Win32 file systems. Files types that are supported by the Win32 file system are referred to herein as "regular files", whereas UNIX features or other files that are not supported by the Win32 file system are referred to herein as UNIX features and special UNIX files. For example, special UNIX files include hard links, soft links, FIFOs (First In First Out special file), named sockets and devices. UNIX features (also referred to herein as "characteristics") include the access permissions, as well as ownership characteristics such as the owner (UID), and the group (GID) definition of a file.

Hard links are used to bind a file to a particular name in the file system. Symbolic links (e.g., soft links) are used to bind a particular file name to another file or directory name and may, for example, be used to by-pass some limitations of the hard links. A file or directory can be bound to more than one symbolic link. A FIFO allows data to be entered into a file and removed in the order that it was entered in. A FIFO may be opened by multiple processes for reading or writing. A device file allows an application to access a special hardware device of the computer. A named socket is used by processes of a same system to communicate. Each process can read/write information into a socket. Access permissions allow a user to designate, on a file by file or directory by directory basis, who has permission to read and write to a particular file or directory. The UNIX features (also referred to herein as "characteristics") for the owner and group allow categorizing the access permission into three categories: the owner, the group and the others.

During development of an embedded application, it is often advantageous to use a target computing environment (e.g., a "target") and a host computing environment (e.g., a "host"). The target is the device for which the application is being developed, and the host is used to develop the application for the target. In many circumstances, the target and host use different OSes (e.g., the host may run a Windows OS and the target may run a UNIX OS.)

Often, due to memory constraints, system administrative issues, or to simplify the development process, a process run on a target uses files stored on the host. Also, during the development process or the release process, it may be necessary to create on the host a file system for the target, i.e. a file system that the target OS can manage.

Sun Microsystem's NFS (Network File System) is an example of a software package that allows a target system to access files that are located on the host system. In NFS, files are loaded into the memory on the target as needed, so that there is no need to store the files on the target file system. To implement this, NFS mounts a directory on the target file system to a remote directory on the host. The host and target communicate in NFS via different commands set forth in the publicly available NFS protocol. As the host file system may not be able to handle all the file types or features of the target file system, such file types are located on the target file system.

SUMMARY

In accordance with a first embodiment of the present invention, a method for emulating one or more functions is provided. A client process receives, from a first processing device, a request comprising a first data indicating a first file that a second file system resident on a second processing device does not support is received information indicative of the request is sent to a server process from the client process. In the server process, a second data for emulation of the first file is located, and a response based upon the first and second data is formed. The response is sent from the server process to the client process. The response, or information based on the response is sent from the client process to the first processing device.

In a second embodiment according to the present invention, a method for emulating one or more functions is provided. From a client process, a request comprising a first data indicating a first file that a second file system resident on a second processing device does not support is received. In an emulation library, a second data for emulation of the first file is located. A response based upon the first and second data is formed. The response to the client process is sent.

In accordance with other embodiments of the present invention, computer readable media are provided, which have stored thereon, computer executable process steps for implementing the methods of the embodiments described above.

DETAILED DESCRIPTION OF THE PREFERRED EMBODIMENT

In accordance with an embodiment of the present invention, an emulator, which may include an emulation library, is provided that can handle all the file types on a first file system (including file types stored on, but not supported by, the file system) and all the features of a second file system. For example, the first file system could be a Win32 file system on a host, and the second file system could be a UNIX file system on a target.

In one embodiment according to the present invention, a request for information (e.g., functions or files) is received on a first processing device. For example, a process (e.g., any executable entity) could request information relating to a file or a directory. The process may, for example, reside on the first processing device, or on a second processing device. Preferably, the first processing device is using a non-UNIX file system (e.g., Win32) and the information includes characteristic(s) (e.g., UNIX special functions) and/or file(s) (e.g., a special UNIX file). The emulation library is located on the first processing device. The emulation library comprises data in a database for emulation of the requested information. The emulation library uses the data from the database to emulate the requested information, and returns the requested information in a response to the process. The process may be a separate application (e.g., executable entity) which interacts with other applications on the system (e.g., an NFS server, a file system creator, a shell application, or a file utility) or can be implemented as a part of such applications. Moreover, although the response is preferably generated by the emulation library, it is also possible to have the response generated by the process, based upon data returned to it by the emulation library.

In the description that follows, the embodiments of the present invention are primarily described in the context of an NFS server process because it shows a clear separation between the target and the host file systems. However, it should be apparent to one skilled in the art that the NFS server is used only as an example and that the emulator can be used by other tools located on the host to, for example, create the target file system without any connection with the target. Such a file system can be then put in a storage device of the target.

Figure 1:
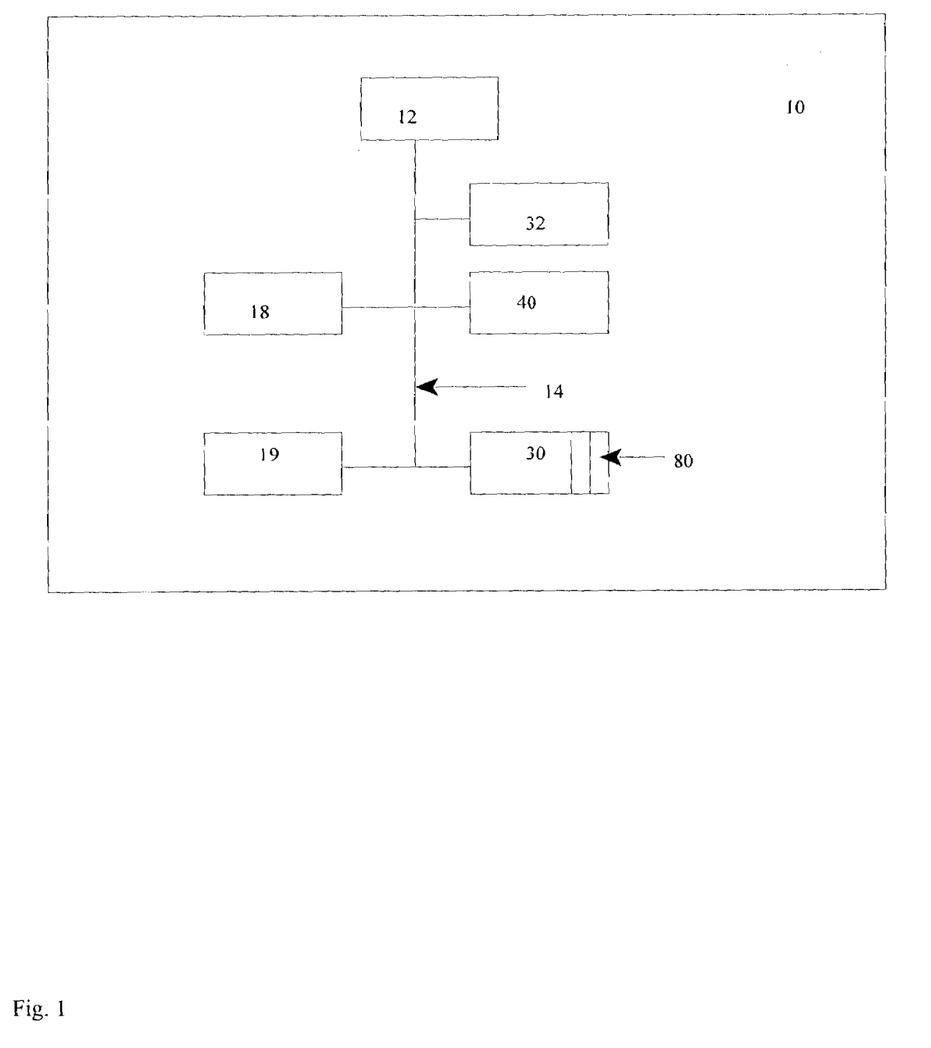
FIG. 1 shows a computer system.

FIG. 1 shows an exemplary computer system 10. The computer system 10 includes a central processing unit (CPU) 12 coupled through a system data bus 14 and a network interface 18. Also included is a non-volatile storage device (e.g., a hard drive) 30 and a volatile storage device (e.g., RAM) 32. The operation of the network interface 18 is sufficient to support the reading of data (e.g., executable, data, and configuration files) from a non-volatile resource (e.g., a hard drive or another computer system 10). A video display device 19 is also provided as a peripheral device coupled to the system bus 14. Other peripherals 40 may also function as part of the computer system 10. These other peripherals 40 may include, for example, controllers supporting audio and real-time video, or SCSI device controllers. An OS, which can be located on the non-volatile storage device 30 or in volatile storage device 32, is configured to function with the system data bus 14, network interface 18, video display device 19, non-volatile storage device 30, volatile storage device 32, and other peripherals 40. Located on the non-volatile storage device 30 are a plurality of files 80 arranged in a file system. Preferably, the OS uses a file system driver to access the files 80 of the file system. The files 80 may also be used to communicate with the devices 14,18,19,30,32,40 on the system or another system. For example, in a UNIX system files 80 that define symbolic links can be used to facilitate communication within the file system. Likewise, files 80 that specify device drivers can be used to allow the OS to communicate with the devices 14,18,19,30,32, 40.

Figure 2:
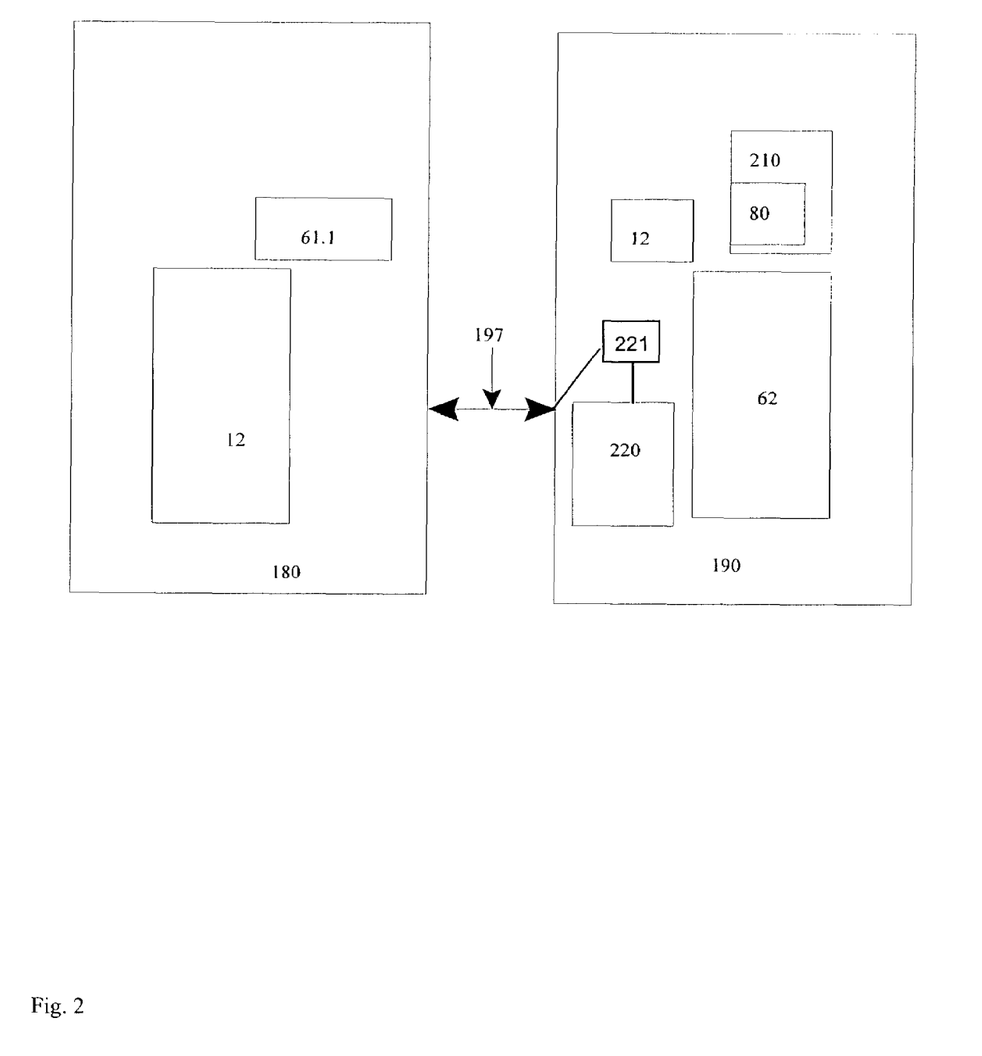
FIG. 2 shows a target system and a host system in a first embodiment of the present invention.

FIG. 2 shows a target computing environment 180 (hereinafter "target system") and a host computing environment 190 (hereinafter "host system"). The target system 180 and host system 190 may have the same architecture as the system 10 shown in FIG. 1. However, in certain embodiments according to the present invention, the non-volatile memory 30 device is not present or is minimized on the target system 180. Also, in certain embodiments according to the present invention, the files 80 are not present on the target system 180. Similarly, the target 180 may not include the display device 19 or peripherals 40. A communication link 197 is present between target system 180 and host system 190. The communication link 197, could be, for example, a wireless link (e.g., a wireless network) or a direct link (e.g., copper cable). Moreover, the host system 190 could be a system comprising a plurality of processing devices (e.g., a distributed network or cluster).

Figure 3:
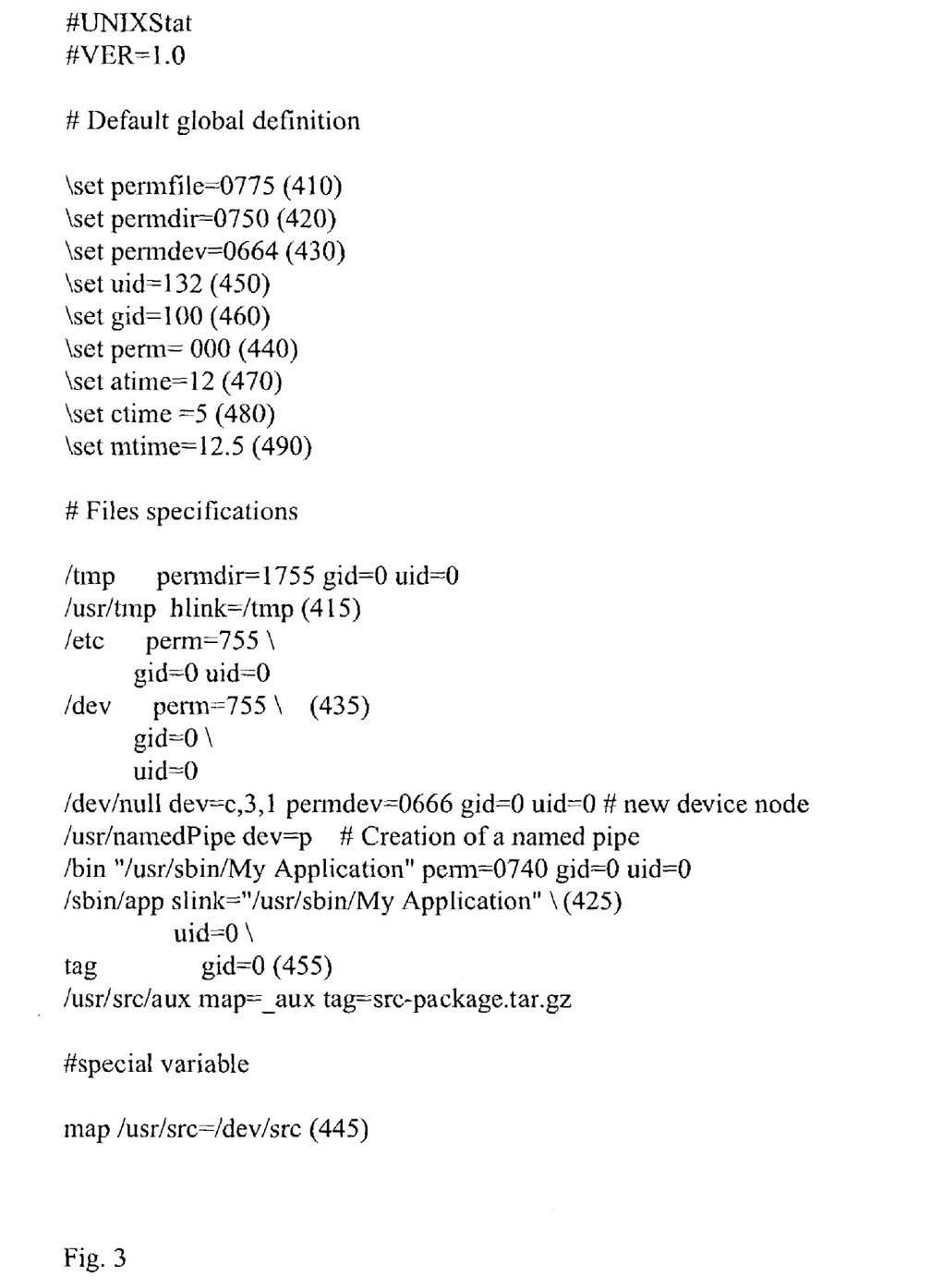
FIG. 3 is illustrative of an exemplary configuration file of the emulation library.

A host OS 62 executes on the host system 190. The file system of the host system 190 (for example, a Win32 file system) includes a repository 210 for storing one or more files 80 used by the target system 180 and an emulation library 220. The emulation library 220 can be linked with any application of the host system 190 (e.g., an NFS server, a File System Creator tool, a shell application, or file utilities). The emulation library 220 provides common functions to the host application, so that the host application can access a sub-set of the host file system as if it is the target file system. For example, if the host file system format is a Win32 file system and the target file system format is a UFS file system, the emulation library (e.g., a UNIX file library) provides functions that act like common UNIX functions to access a desired sub-set of the Win32 file system as if it is a UFS file system. A configuration file is used to configure the emulation library (e.g., for a particular system). An exemplary configuration file is shown in FIG. 3.

A server process (e.g., an NFS server) 221 linked with the emulation library 220 allows the target system 180 to request information and files from the host repository 210. The server process 221 is used by the host system 190 to send back requested information to the target system 180.

Preferably, target 180 has stored thereon only a boot loader. The boot loader can, for example, be stored on an EPROM (erasable programmable read-only memory) or Flash memory. A boot loader is a program that initiates execution of the OS 61.1. All other files, including OS and application files reside on the host system 190. As the processor 12 executes, it loads the necessary OS and application files into memory as needed. To do this, the target 180 requests the needed files from the host system 190. In this manner, the OS 61.1 executes on the target 180, despite the fact that only a boot loader is stored in non-volatile memory on the target 180.

When the OS 61.1 detects that needed information is not in memory 32, the OS 61.1 sends a request to the host system 190 for a file 80 that comprises the information. For example, if the OS 61.1 needs a file to perform a function or to allow an application executing on it to perform a function, the OS 61.1 sends a request to the host system 190. Preferably, the request and the host's response thereto are sent via the NFS protocol. The nature and format of the NFS protocol are well known and therefore will not be discussed herein. In any event, when the request for file information is received at the host 190 by the server process 221, the server process 221 queries the emulation library 220 for the file information. The emulation library 220, in turn, checks the repository 210 and an internal database for the file information (as used herein, the term "emulation library" refers to the library in general, including the internal database). In this regard, if the requested file is a regular file, the emulation library 220 will retrieve the file 80 from the repository 210. However, if the requested file is a special UNIX file, such as a device file, the emulation library 220 will access its internal database to retrieve the information for that special UNIX file. The emulation library 220 includes information (e.g., data) sufficient to emulate the special UNIX files and the UNIX features, also referred to herein as characteristics. The emulation library 220 uses the information to generate an answer to the server process 221, which transmits the information to the target 180 via a responsive command (e.g., an NFS command). In certain preferred embodiments of the present invention, the emulation library 220 combines the information from the repository 210 with information from its internal database. For example, the emulation library 220 might insert UNIX permissions in a response to the request for a regular file in the repository 210.

Preferably, the host system 190 uses a Win32 file system, and the target system 180 uses a UNIX file system (e.g., UFS). Most preferably, the OS 61.1 is WindRiver's BSD/OS, using the UFS file system. In certain embodiments according to the present invention where the server process is an NFS server, the host system 190 and the NFS server can process NFS commands for one or more target systems. As noted above, FIG. 3 is illustrative of an exemplary configuration file of the emulation library 220 (e.g., a UNIX file library) and the emulation library 220 comprises data to emulate a UNIX file system on a Win32 file system.

The configuration file of the emulation library 220 defines the behavior of the emulation library 220 for the files 80 in the repository 210 managed both globally (e.g., by a global variable), and on a file by file basis (e.g., by overloading a variable). Preferably, the values of the global variables are defined by a special command '\set'. A plurality of global variables can be used in the configuration file of the emulation library 220. For example, a permfile variable 410 can be used to define the default permission value for a file. A permdir variable 420 can be used to define the default permission value for a directory. A permdev variable 430 can be used to define the default permission value for a UNIX device file. A uid variable 450 can be used to define the default numeric user ID ("UID") of the file or directory. A gid variable 460 could be used to define the default numeric group ID ("GID") of the file or directory. An atime variable 470 can be used to define the default access time of a file or directory. A ctime variable 480 can be used to define the default status-changed time of a file or directory. A mtime variable 490 can be used to define the default modification time of a file or directory. On a file by file (or directory by directory) basis, a perm variable 440 can be used to define the permission value for the file (or directory). Preferably, the value of all the global variables can be overloaded (e.g., overwritten) on a file by file (or directory by directory) basis.

A plurality of special variables may also be used in the configuration file of the emulation library 221. For example, an hlink variable 415 can be used to define a hard link. Preferably, the hlink variable 415 uses a string for defining the target of the link. An slink variable 425 can be used to define a soft (symbolic) link. Preferably, the slink variable 425 uses a string for defining the target of the link. A dev variable 435 defines UNIX device file, a FIFO and/or a named socket. Preferably, the dev variable 435 uses a syntax to define the values and the type of the device file, FIFO, or named socket.

A plurality of special purpose variable names can also be present in the configuration file of the emulation library 220. For example, a tag identifier 455 can be used to select all entries marked with a specific tag.

If the data for a particular feature of the UNIX directory is not present, a default is used. Most preferably, defaults are defined for permission access, UID, and GID.

It should be noted that the configuration file is used to initialize the emulation library and is not consulted by the emulation library during execution of the emulation library. Preferably, however, when the operation of the emulation library changes the initialized data (e.g., a new file is created, or permissions are changed), these changes are written back into the configuration file by the emulation library.

The configuration file is preferably implemented as a text file, such as the file of FIG. 3. However, it should be understood that other file formats are possible, such as a binary file, a plurality of binary files, or a plurality of text files. Most preferably, each line in the file defines either a command or a file.

Figure 4:
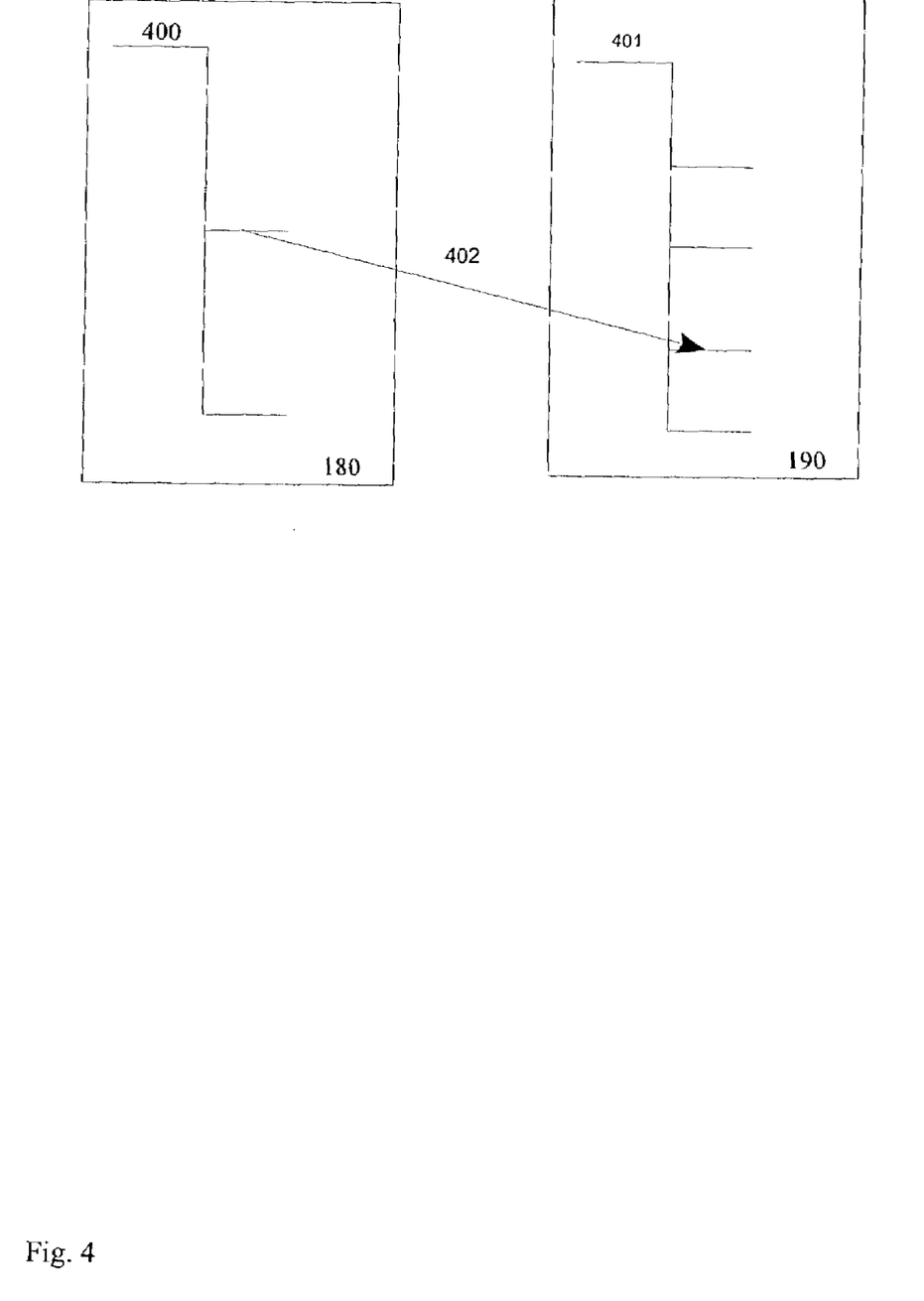
FIG. 4 shows a first and second directory structure.

FIG. 4 illustrates a first and second directory structure 400,401. The directory structures 400,401 are representations of the file systems on the target system 180 and on the host system 190, respectively. The first directory structure 400 can be implemented on a UNIX file system (e.g., UFS), and the second directory structure 410 can be implemented on a Win32 file system. Preferably, the names of files or directories that are needed by the target system 180, but are not present on the target system 180, are present in the first directory structure 401. However, since the file or the directory is not on the target system 180, a pointer 402 is provided in place of the file or the directory. The pointer 402 points to the corresponding file or directory on the second directory structure 401. In certain embodiments, the repository 210 of the host system 190 can be mounted onto the first directory structure 400, for example, by NFS.

When the target OS 61.1 needs a particular file or directory, it looks for the file in the first directory structure 400. If the file is not present, the link 402 directs the target OS 61.1 to the location of the file in the second directory structure 401. The target OS 61.1 then sends a request for the file to the host system 190. Preferably, the request is sent by NFS. The server process 221 on the host system 190 uses the data in the request to create a valid file or directory request to the emulation library 220. The emulation library 220 locates the requested file or directory in the second directory structure 401 and/or emulates the file or characteristics thereof. Once the file is found and/or emulated, it or characteristics thereof are returned to the target system 180. Preferably, the request to the host system 190 is transparent from the point of view of the target OS 61.1.

Figure 5A:
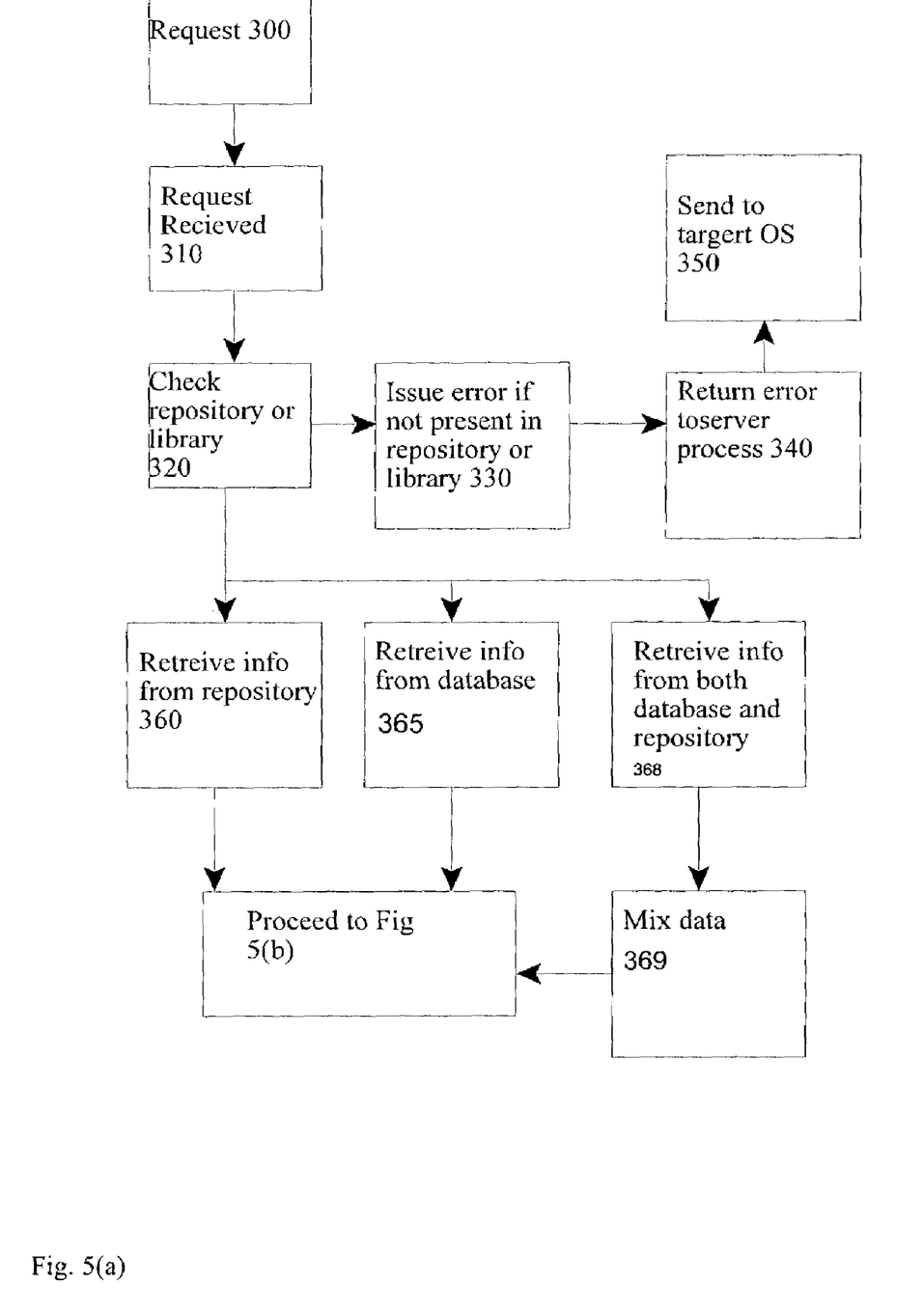
FIG. 5 shows an exemplary method for emulating the file system of a target system on a host system.
Figure 5B:
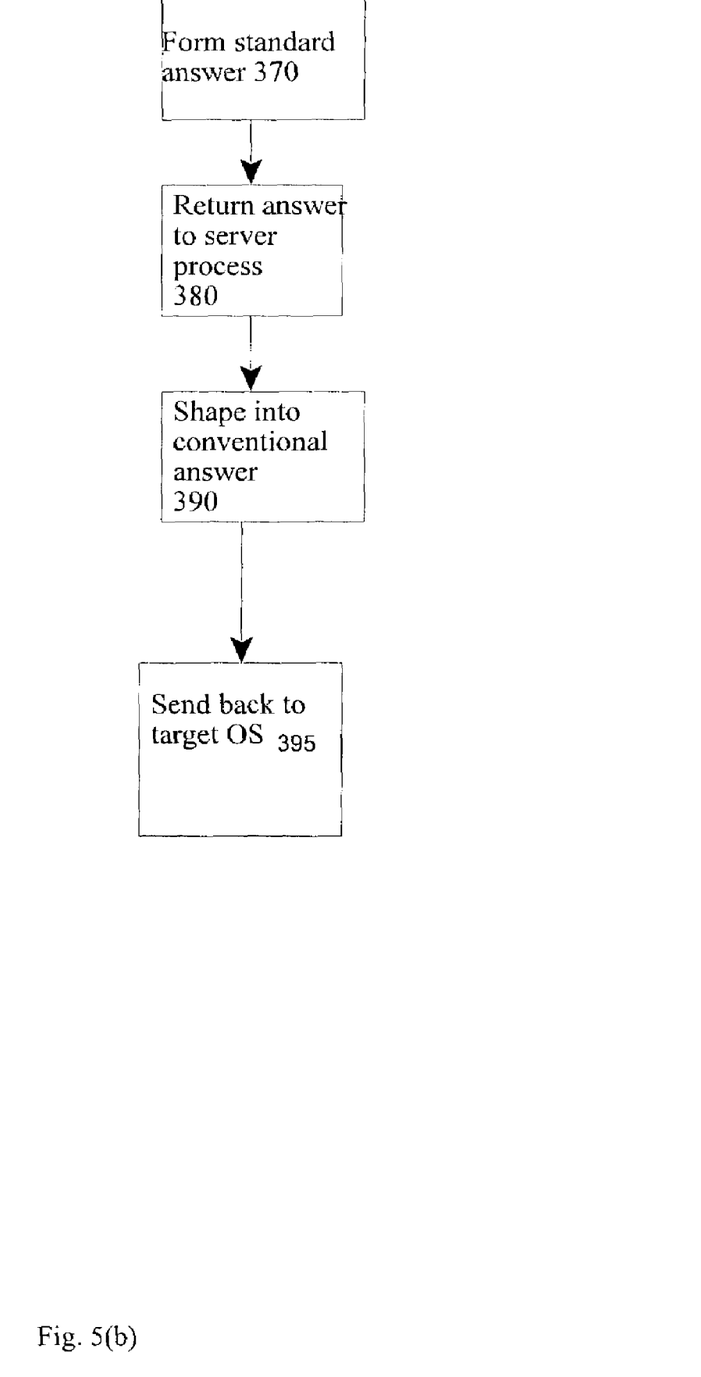

FIG. 5 shows an exemplary method for using an emulation library on the host system to emulates the behavior of some target system functions. The host system could be the host 190 of FIGS. 2 and 6, and the target system could be the target of FIGS. 2 and 6.

Referring to FIG. 5, a file request is sent from the target system (Step 300) and received on the host system (Step 310), by the server process 221 (for example, an NFS server). The file request comprises a request for a file that may have characteristics not supported by the file system of the host OS 62. In other words, the request could be for a regular UNIX file, a special UNIX file, or a request related to UNIX (e.g., UNIX features). In certain embodiments of the present invention, the request can comprise a file not supported by the file system of the host OS 62. For example, the requested file could be for a device file, hard link, soft link, FIFOs or a named socket. As explained above, a hard link allows a file to be added to the file system (e.g., a character string in the file system points to a physical location on a hard drive.) A soft link allows one indicator to refer to another indicator (e.g., one or more character strings in the file system refer to a character string pointing to the physical location of the file on the hard drive). FIFOs refer to the physical locations on a memory device (e.g., a hard drive or volatile memory) where a related block of data starts and ends. FIFOs allow data to be stored and read in the order it is inserted into the block. The requested UNIX feature could be a change of UNIX permission, and/or a UNIX ownership characteristics. UNIX permissions specify which processes can access a particular data element (e.g., a file).

The file request can be sent by a wireless connection, such as a WLAN, or a direct connection, such as a LAN. However, it should be understood to one skilled in the art that wireless and direct connections are offered only as exemplary embodiments, and other types of connections could be used.

A check is made to determine if the requested file exists either in a repository or in the emulation library database (Step 320). If the requested file does not exist either in the repository or in the emulation library database, an error is issued (Step 330). Preferably, the error message is a standard error. The error is returned to the server process (e.g., the process linked with the emulation library) (Step 340), which sends it back to the target OS 61.1 as a response to the file requested (Step 350).

If the requested file only exists in the repository, the standard Win32 information (e.g., the size of the file or the access time) for that file is retrieved from this repository (Step 360). This can be done for example by using a dedicated OS 62 function. The standard Win32 information is completed by adding default data from the emulation library (e.g., access permission or ownership) to form a response (Step 370). The information is returned to the server process (Step 380). The server process formats it into a response (e.g., an NFS answer) (Step 390), and the response is sent back to the target OS 61.1 (Step 400).

If the requested file only exists in the internal database of the emulation library, the information concerning that file is retrieved from the database (Step 365). For example, since the UNIX special files (hard and soft links, devices, FIFOs, named socket) do not exist on the Win32 file system, data for the UNIX special files are maintained in the emulation library. The information concerning that file is returned to the server process (Step 380), where it is formatted into a response (e.g., an NFS answer) (Step 395). The response is then sent back to the target OS 61.1 (Step 400).

If the file exists in both the repository and the emulation library internal database, the information is retrieved from this repository and from the database (Step 368), and the data are mixed (Step 369) to form an appropriate response for the server process 221. For example, the size of the file and the access time are read from the repository, but the permission access and the ownership are read from the emulation library database.

It should be noted that the requested UNIX feature could also be a file name that is permissible under UNIX, but not under Win32. In such a case, the emulation library will convert the requested file name to a valid Win32 file name (e.g., by replacing invalid Win32 characters with valid Win32 characters). When returning information relating to this file, the emulation library will convert the file name back to the original file name.

Table 1 shows an exemplary output given by an embodiment of the emulation library of the present invention in response to a UNIX "ls" command as it relates to a plurality of files in a Win32 file system. Table 3B, discussed in more detail below, is an example of a configuration file that could be used to configure an emulation library which would provide the response of Table 1.

TABLE 1

| | | | | | | | |
|---|---|---|---|---|---|---|---|
| 600361 | drwxrwxr-x | | 10 | 0 | 4096 | Mar 15 16:03 | . |
| 131181 | drwxrwxr-x | | 90 | 0 | 8192 | Mar 15 17:14 | .. |
| 0 | crw-rw---- | 10 | 20 | | 10,3,20 | Mar 15 17:14 | device |
| 351338 | drwxrwxr-- | 1 | 10 | 10 | 0 | Mar 15 16:00 | test |
| 2186349 | -rw-r--r- | 1 | 132 | 100 | 5 | Mar 15 15:59 | testfile1 |
| 1006707 | -rw----rw- | 2 | 178 | 10 | 34 | Mar 15 16:03 | testfile2 |
| 1006707 | -rw----rw- | 2 | 178 | 10 | 34 | Mar 15 16:03 | testfile__hlnk |
| 1399918 | lrwxrwxrwx | | 10 | 0 | 98 | Mar 15 15:59 | testfile__lnk -> testfile1 |
| 1006705 | lrwxrwxrwx | | 10 | 0 | 108 | Mar 15 16:00 | testfile__lnk2 -> test/testfile2 |

In contrast, Table 2 shows an exemplary output of a Win32 "dir" command as it relates to the plurality of files in the Win32 file system that does not use the emulation library in accordance with the present invention.

TABLE 2

| | | | |
|---|---|---|---|
| 03/15/02 | 04:03p | \<DIR\> | . |
| 03/15/02 | 04:03p | \<DIR\> | .. |
| 03/15/02 | 04:00p | \<DIR\> | test |

TABLE 2-continued

| 03/15/02 | 03:59p | 5  | testfile1 |
| 03/15/02 | 04:03p | 34 | testfile2 |

Table 3A shows exemplary source code that can be used to implement certain embodiments of the present invention. This source code is an application which is linked with the emulation library, and is provided herein to show how the emulation library can be accessed to emulate a UNIX file system. As noted above, the emulation library is an executable that is initialized with the configuration file (e.g., Table 3B discussed below). In this example, applications (such as the source code of Table 3A) interact directly with the emulation library (i.e., without a server) via a set of emulation library functions with the nomenclature "unix_. . ." such as unix_open, unix_close, unix_chown, unix_unlink, unix_write, etc. These emulation library functions are the entry points to the emulation library for the linked applications, and perform the work of looking for, and processing, the information in the emulation library internal database and in the repository.

Returning to Table 3A, a "main" function is used to control the flow of the program and to produce error messages if out of bound values are encountered. To remove an existing file a unix_unlink function is used. Similarly, to open a file, close a file, and write to a file, a unix_open, unix_close, and unix_write function are called, respectively. A section of the code displays the information for a particular file using the unix_stat function. Specifically, the inode number, inode mode, permission data, user ID, group ID, and entry's size of the file are displayed. Also, unix_chown and unix_chmod functions are used to change the user ID and group ID, and to change permissions of a file.

TABLE 3A

```
#include <unixfileLib.h>
#include <fcntl.h>
int main
    (
    int argc,
    char ** argv
    )
    {
    char       filename[PATH_MAX];
    struct unix_stat   statBuff;
    int        fd;
    char *     string = "Test file creation.";
    if (argc < 3)
        {
        printf ("Error: syntax is: stat <repository> <statfile>.\n");
        exit (1);
        }
    if (unixFileInit (argv[2],
                     argv[1],
                     UF_COMMENT_BAD_ENT|UF_VERBOSE_ERR) == ERROR)
        exit (1);
    strcpy (filename, argv[1]);
    strcat (filename, "/test.file");
    /* Remove existing file */
    unix_unlink (filename);
    /* Create and open an new file */
    fd = unix_open (filename O_CREAT, 0644);
    if (fd < 0)
        {
        printf ("Error: cannot create file %s\n", filename);
        exit (1);
        }
    /* Write to the file */
    unix_write (fd, string, strlen (string));
    /* Close the file */
    unix_close (fd);
    /* Stat the file to get information */
    if (unix_stat (filename, &statBuff) != 0)
        {
        printf ("Error: cannot stat file %s\n", filename);
        exit (1);
        }
    printf ("\nStat information for file %s:\n", filename);
    printf ("   inode's number: %d\n", statBuff.st_ino);
    printf ("   inode's mode: %d\n", statBuff.st_mode);
    printf ("   permission: 0%o\n", statBuff.st_mode & 07777);
    printf ("   inode's user ID: %d\n", statBuff.st_uid);
    printf ("   inode's group ID: %d\n", statBuff.st_gid);
    printf ("   entry's size: %d\n", statBuff.st_size);
    /* Change user ID and group ID */
    unix_chown (filename, 130, 99);
    if (unix_stat (filename, &statBuff) != 0)
        {
```

TABLE 3A-continued

```
    printf ("Error: cannot stat file %s\n", filename);
    exit (1);
    }
printf ("Changed user Id and group Id\n");
printf ("    inode's user ID: %d\n", statBuff.st_uid);
printf ("    inode's group ID: %d\n", statBuff.st_gid);
/* Change permissions */
unix_chmod (filename, 0622);
if (unix_stat (filename, &statBuff) != 0)
    {
    printf ("Error: cannot stat file %s\n", filename);
    exit (1);
    }
printf ("Changed access permissions\n");
printf ("    inode's mode: %d\n", statBuff.st_mode);
printf ("    permission: 0%o\n", statBuff.st_mode & 07777);
return 0;
}
```

Table 3B shows an exemplary configuration file for the emulation library. Definitions for a device are defined by "/device gid=20 dev=c,10,3,20 permdev=0660." A directory is defined by "/test uid=10 gid=10 permdir=0774." Definitions for a regular file are defined by "/test/testfile2 permfile=0666." "/testfile1 uid=132 gid=100 permfile=0644" defines another regular file. "/testfile_lnk slink=testfile1" defines a symbolic link. "/testfile2 uid=178 gid=10 permfile=0606" defines a regular file. "/testfile_hlnk hlink=/testfile2" defines a hard link. The configuration file is used to initialize the emulation library. As noted above, the configuration file is not consulted by the emulation library during execution of the emulation library. Preferably, however, when the operation of the emulation library changes the initialized data (e.g., a new file is created, or permissions are changed), these changes are written back into the configuration file by the emulation library.

TABLE 3B

```
#UNIX Stat
#VER=1.0
/device         gid=20 dev=c,10,3,20 permdev=0660      # definition of a device
/test           uid=10 gid=10 permdir=0774             # definition of a directory
/test/testfile2 permfile=0666                          # definition of a regular file
/testfile1      uid =132        gid=100    permfile=0644# definition of a regular file
/testfile_lnk   slink=testfile1                        # definition of a symbolic link
/testfile_lnk2  slink=test/testfile2                   # definition of a symbolic link
/testfile2      uid=178         gid=10 permfile=0606# definition of a regular file
/testfile_hlnk  hlink=/testfile2                       # definition of a hard link
```

An output from the above source code is shown in Table 4. The output is formed by executing the source code in Table 3A using an emulation library initialized with the exemplary configuration file shown in Table 3B. For example, the permission of 0644 is displayed when the "printf ("permission: 0%o\n", statBuff.st_mode & 07777)" is executed. Likewise, the inode's user ID and inode's group ID are displayed when the printf ("inode's user ID: %d\n", statBuff.st_uid) and printf ("inode's group ID: %d\n", statBuff.st_gid) are executed. On the successful return from unix_chown (filename, 130, 99), the program proceeds to execute printf ("Changed user Id and group Id\n"), printf ("inode's user ID: %d\n", statBuff.st_uid), and printf ("inode's group ID: %d\n", statBuff.st_gid). This results in the output of "Changed user Id and group Id, inode's user ID: 130, and inode's group ID: 99." Similarly, on the successful return from unix_chmod (filename, 0622), the printf ("Changed access permissions\n"), printf ("inode's mode: %d\n", statBuff.st_mode), and printf ("permission: 0%o\n", statBuffst_mode & 07777) are executed. This produces the output of "Changed access permissions, inode's mode: 33170, and permission: 0622."

TABLE 4

Stat information for file /repository/test.file:
    inode's number: 1252601368
    inode's mode: 33188
        permission: 0644
    inode's user ID: 0
    inode's group ID: 0
    entry's size: 19

TABLE 4-continued

Changed user Id and group Id
    inode's user ID: 130
    inode's group ID: 99
Changed access permissions
    inode's mode: 33170
    permission: 0622

In certain embodiments according to the present invention, the repository 210 and the text configuration file of the emulation library 220 can be combined into a single file managed by the emulation library. Preferably, the data contained by the emulation library describes a UNIX file system (e.g., UFS) rather than the Win32 file system, and is viewable in the Win32 file system. In such an embodiment, the host system 190 can also be implemented as a dedicated server. In another embodiment according to the present invention, the repository 210 and the emulation library 220 can be combined into a combined library. Also, the emulation library 220 or the combined library can be implemented as a single file, or as multiple files.

Figure 6:
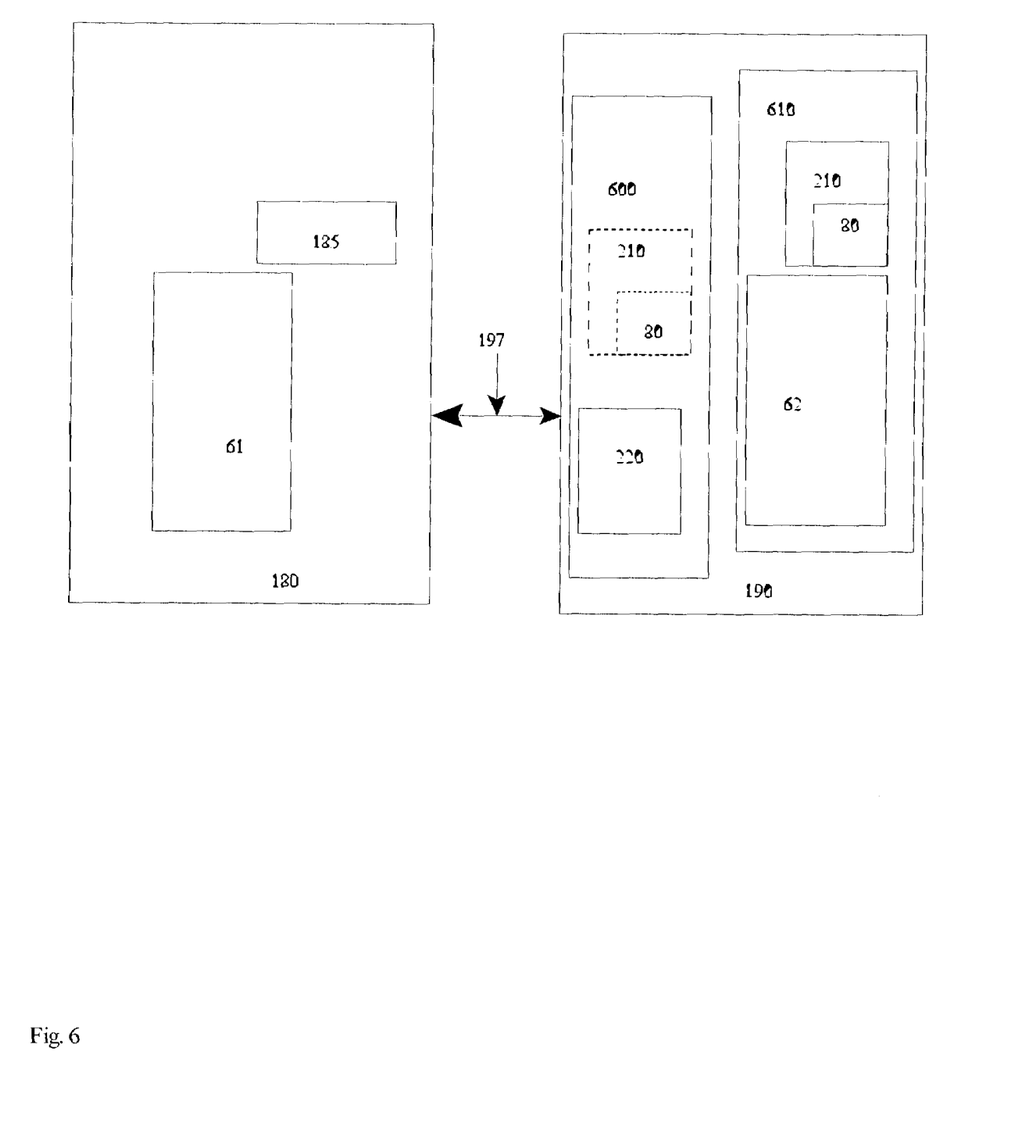
FIG. 6 shows the target system and the host system in another embodiment of the present invention.

FIG. 6 shows the target system 180 and the host system 190 in another embodiment of the present invention. A second partition 600 on the non-volatile storage device 30 is used on the host system 190 to support the repository 210 and emulation library 220 used by the target system 180. In certain embodiments, the repository 210 is located in the second partition 600 (preferably in a single binary file with the emulation library 220) as illustrated in dashed lines in FIG. 6. In other embodiments, the repository remains in the first partition 610 with the OS 62 as illustrated with solid lines in FIG. 6. Preferably, the second partition 600 uses a UNIX file system (e.g., UFS or FFS). Most preferably, the second partition 600 is viewable from a first partition 610 via drivers on the host system 190, also located on the non-volatile storage device 30. Preferably, the first partition 610 uses the Win32 file system and the files for the host OS 62 are resident thereon.

Similar to FIG. 2, the host system 190 uses the data in the emulation library 220 and files in the repository 210 to emulate the file system of the OS 61.1. However, instead of accessing the requested data on the same partition as the OS, the host system 190 uses drivers to retrieve the requested information from the repository 210 and/or emulation library 220.

Figure 7:
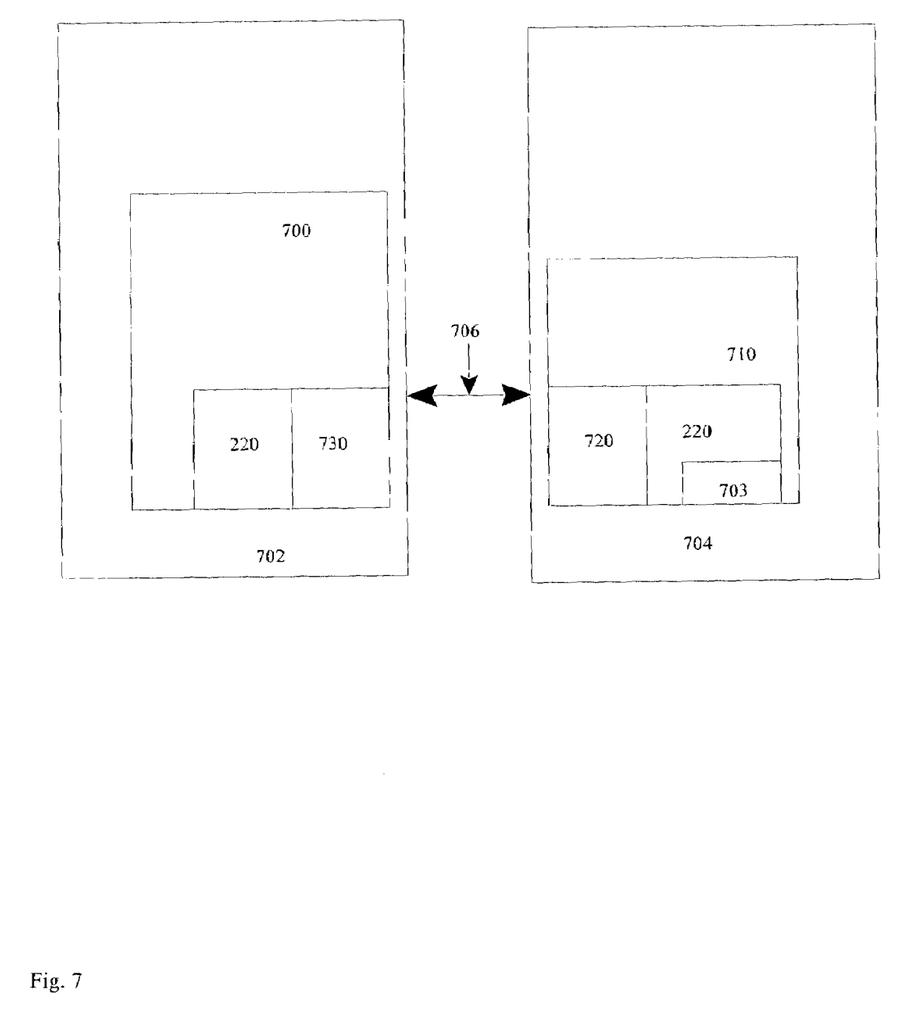
FIG. 7 shows another embodiment of the present invention.

FIG. 7 shows the emulation library 220 split into two parts over a client process 700 on a first system 702 and a server process 710 on a second system 704. The first system and second system 702,704 communicate by a link 706 (e.g., a LAN or WAN network). Preferably, the server process 710 executes as a WIN32 process. However, it should be understood by one skilled in the art that the server process 710 or client process 700 could execute over a variety of different operating systems, such as Linux.

The server process 710 and the client process 700 use a shared memory space 720 for communication. In FIG. 7 the shared memory space 720 is shown located on the server process 710. However, one skilled in the art will appreciate that the shared memory space 720 could also be located on the client process 700 or distributed over both the client process 700 and the server process 710. An API 730, for example, located on the client process 700, can be used to allow the client process 700 to access the shared memory space 720 and allow communication between the client and server processes 700,710. However, it should be understood that in certain embodiments according to the present invention, the API 730 can be located on the server process 710, or on both the server and client processes 700,710.

The server process 710 is used to manage the emulation library. The client process 700, preferably, implements path calculation and the API(s) 730. Specific APIs 730 can be used based on the desired function, although it should be understood to one skilled in the art that a single API that implements multiple functions could also be used. For example, to create a symbolic link the API 730 used may have the nomenclature of ufile_symlink (path1, file2), or the nomenclature of ufile symlink (path1, file2) could be used to access a specific function in an API 730 that comprises multiple functions. As an example, if the client process 700 requests the ufile_symlink, the client process 700 formats a request and places the request in a shared memory area. The server process receives the request through the shared memory area 710. The server process then modifies the internal database of the emulation library and sends a status to the client process 700.

In another embodiment of the present invention, a plurality of client processes 700 distributed over a plurality of system could access the server process 710.

Figure 8:
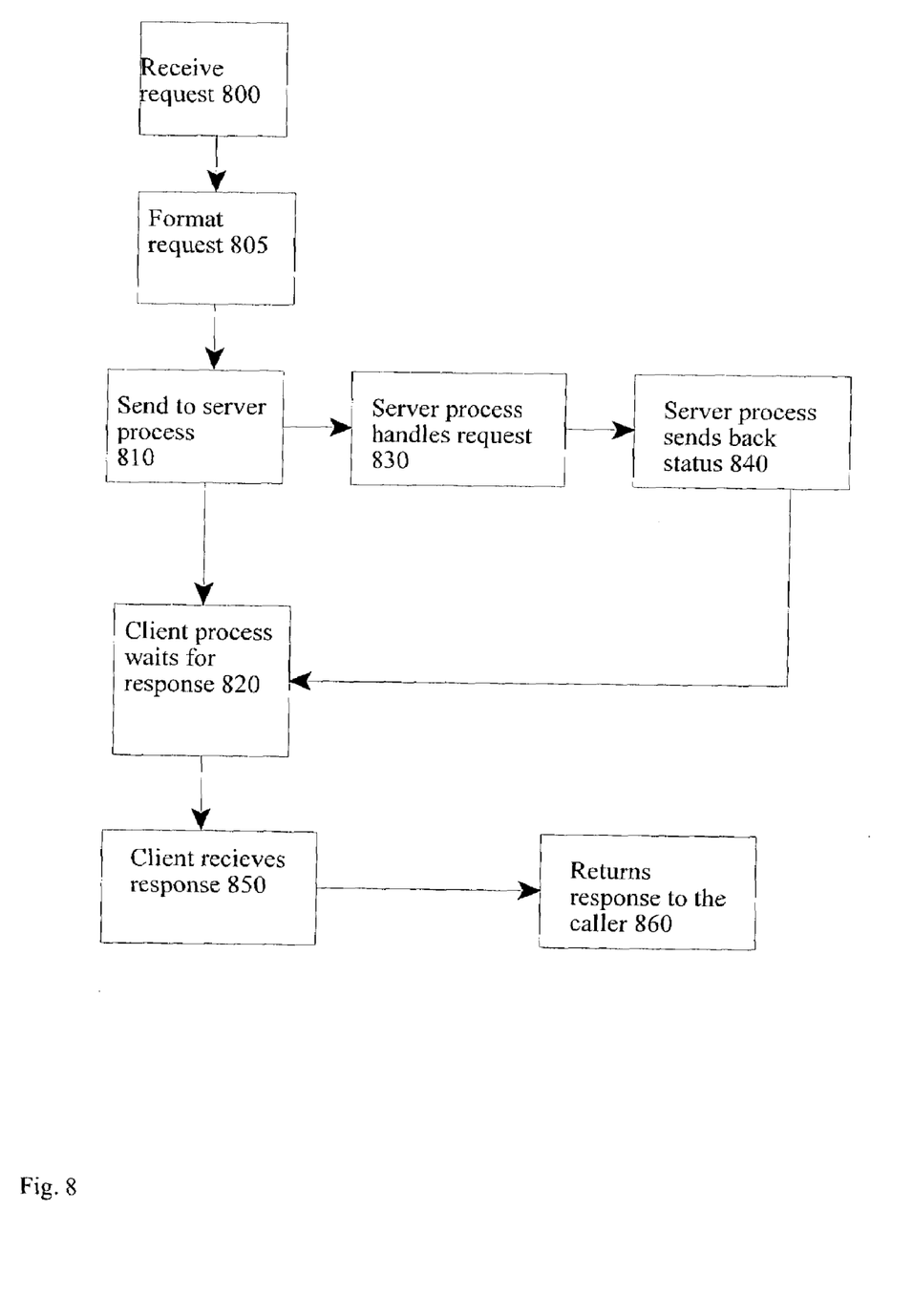
FIG. 8 shows an exemplary flowchart for the embodiment of FIG. 7.

FIG. 8 shows a method by which the embodiment of the present invention in FIG. 7 functions. The client process receives a request (Step 800) from a caller. In a certain embodiment according to the present invention, the request could originate from the target system of FIG. 2 (i.e., the caller is the target system). In such an embodiment, the client and server processes 700,710 comprise the functionality of the host system of FIG. 2 (e.g., the functionality of the host system is distributed over a client and server architecture).

The client process formats requests (Step 805). The client process sends the request to the server process (Step 810), and waits for the response from the server process (Step 820). Preferably, the API 730 is used to send the request to the server. The request can be placed in the shared memory space 720 by the API 730.

The server process handles the request (Step 830) and sends back a response (e.g., a status) (Step 840). The server could retrieve the request from the shared memory space 720. Step 840 could be performed by placing the response back in the shared memory space 720. The client receives the response (Step 850) and returns the response to the caller (e.g., the target system) (Step 860).

For example, if the client receives a request to create a symbolic link, a ufile_symlink (path1, file2) API is used to format and send the request. The API could resolve the path1 of the request to have a full path name (e.g c:\dir1\dir2\dir3\file2). In Step 805, the client process then formats the request with a plurality of arguments, such as "request: create link," "arg1: path1," and "arg2:c:\dir1\dir2\dir3\file2," and places the request in shared memory. When the server process retrieves the request from the shared memory, the server decodes the request, handles the request, updates the internal database 703 of the emulation library, and sends back a response to the client and places the response in shared memory. The response informs the client whether the call succeeded. In certain embodiments according to the present invention, the response could be a path and/or comprise other pertinent data. The client responds with the status to the caller.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for emulating one or more functions comprising the steps of:

receiving, on a client process, a request from a first processing device comprising a first data indicating a first file that a second file system resident on a second processing device does not support;

sending information indicative of the request to a server process from the client process;

locating in the server process, a second data for emulation of the first file;

in the server processes, forming a response based upon the first and second data; and sending the response to the client process from the server process;

sending the response, or information based on the response, from the client process to the first processing device.

2. The method as recited in claim 1 wherein the server process further comprises an emulation library.

3. A method for emulating one or more functions comprising the steps of:

receiving from a client process, a request comprising a first data indicating a first file that a second file system resident on a second processing device does not support;

locating in an emulation library, a second data for emulation of the first file;

forming a response based upon the first and second data; and sending the response to the client process.

4. The method as recited in claim 3 wherein the steps of receiving, locating, forming, and sending are performed on a server process.

5. The method as recited in claim 1 wherein the first processing device is a target system and the client process and server process are resident on one or more host systems.

6. The method as recited in claim 1, wherein the client and server process communicate via shared memory.

7. The method as recited in claim 1 wherein the second data is stored in an emulation library.

8. The method as recited in claim 7 wherein the emulation library further comprises a database.

9. The method as recited in claim 1 the step of receiving comprises utilizing a linked directory.

10. The method as recited in claim 1 wherein the first processing device uses a UNIX file system.

11. The method as recited in claim 1 wherein the first data further comprises a file path.

12. The method as recited in claim 1 wherein the second data further comprises a UNIX characteristic.

13. The method as recited in claim 1 wherein the second data further comprises one of a soft link, hard link, FIFOs, named socket, device file, a permission, and an ownership characteristic.

14. The method as recited in claim 1, further comprising receiving, another request, the another request comprising a third data indicating a second file with one or more characteristics that a file system resident on the second processing device does not support;

locating in the database a fourth data for emulation of the characteristics; and forming a response based on the fourth data.

* * * * *